United States Patent
Slutsky et al.

(10) Patent No.: US 11,691,566 B2
(45) Date of Patent: Jul. 4, 2023

(54) INTELLIGENT VEHICLE SYSTEMS AND CONTROL LOGIC FOR SURROUND VIEW AUGMENTATION WITH OBJECT MODEL RECOGNITION

(71) Applicant: GM GLOBAL TECHNOLOGY OPERATIONS LLC, Detroit, MI (US)

(72) Inventors: Michael Slutsky, Kefar-Saba (IL); Albert Shalumov, Petah Tikwa (IL)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 17/528,715

(22) Filed: Nov. 17, 2021

(65) Prior Publication Data

US 2023/0150429 A1 May 18, 2023

(51) Int. Cl.
*B60R 1/00* (2022.01)
*G06T 7/55* (2017.01)
(Continued)

(52) U.S. Cl.
CPC ............ *B60R 1/00* (2013.01); *B60K 35/00* (2013.01); *G06F 18/2163* (2023.01);
(Continued)

(58) Field of Classification Search
CPC ............ B60R 1/00; B60R 2300/105; B60R 2300/207; B60R 2300/303;
(Continued)

(56) References Cited

U.S. PATENT DOCUMENTS

| 2010/0114467 A1* | 5/2010 | Samuel | G08G 1/162 |
| | | | 701/119 |
| 2010/0153868 A1* | 6/2010 | Allen | G06T 13/40 |
| | | | 715/764 |

(Continued)

OTHER PUBLICATIONS

Michael Slutsky, "Using Epipolar Reprojection for Virtual View Perspective Change", U.S. Appl. No. 17/189,877, filed Mar. 2, 2021.

(Continued)

*Primary Examiner* — Terrell M Robinson
(74) *Attorney, Agent, or Firm* — Quinn IP Law

(57) ABSTRACT

Presented are intelligent vehicle systems with networked on-body vehicle cameras with camera-view augmentation capabilities, methods for making/using such systems, and vehicles equipped with such systems. A method for operating a motor vehicle includes a system controller receiving, from a network of vehicle-mounted cameras, camera image data containing a target object from a perspective of one or more cameras. The controller analyzes the camera image to identify characteristics of the target object and classify these characteristics to a corresponding model collection set associated with the type of target object. The controller then identifies a 3D object model assigned to the model collection set associated with the target object type. A new "virtual" image is generated by replacing the target object with the 3D object model positioned in a new orientation. The controller commands a resident vehicle system to execute a control operation using the new image.

20 Claims, 2 Drawing Sheets

(51) Int. Cl.
*G06T 7/70* (2017.01)
*H04N 13/111* (2018.01)
*G06T 19/00* (2011.01)
*B60K 35/00* (2006.01)
*G06V 20/56* (2022.01)
*G06F 18/24* (2023.01)
*G06F 18/21* (2023.01)
*H04N 23/90* (2023.01)
*B60Q 9/00* (2006.01)

(52) U.S. Cl.
CPC ............. *G06F 18/24* (2023.01); *G06T 7/55* (2017.01); *G06T 7/70* (2017.01); *G06T 19/006* (2013.01); *G06V 20/56* (2022.01); *H04N 13/111* (2018.05); *H04N 23/90* (2023.01); *B60K 2370/166* (2019.05); *B60K 2370/178* (2019.05); *B60K 2370/21* (2019.05); *B60K 2370/31* (2019.05); *B60K 2370/52* (2019.05); *B60Q 9/00* (2013.01); *B60R 2300/105* (2013.01); *B60R 2300/207* (2013.01); *B60R 2300/303* (2013.01); *B60R 2300/307* (2013.01); *B60R 2300/60* (2013.01); *G06T 2207/20084* (2013.01); *G06T 2207/30244* (2013.01); *G06T 2207/30252* (2013.01)

(58) Field of Classification Search
CPC . B60R 2300/307; B60R 2300/60; G06T 7/55; G06T 7/70; G06T 19/006; G06T 2207/20084; G06T 2207/30244; G06T 2207/30252; H04N 13/111; H04N 5/247; G06V 20/56; B60K 35/00; B60K 2370/31; B60K 2370/166; B60K 2370/178; B60K 2370/52; B60K 2370/21; G06K 9/6261; G06K 9/6267; B60Q 9/00
See application file for complete search history.

(56) References Cited

U.S. PATENT DOCUMENTS

| | | | |
|---|---|---|---|
| 2011/0115886 A1* | 5/2011 | Nguyen | H04N 13/243 348/47 |
| 2014/0347450 A1* | 11/2014 | Han | G06T 3/0031 348/47 |
| 2015/0248765 A1* | 9/2015 | Criminisi | G06T 7/50 382/106 |
| 2015/0287211 A1* | 10/2015 | Mundhenk | G06T 7/143 382/173 |
| 2018/0225875 A1* | 8/2018 | Yasrebi | B60R 1/00 |
| 2021/0237594 A1 | 8/2021 | Prasad et al. | |
| 2021/0237716 A1 | 8/2021 | Prasad et al. | |

OTHER PUBLICATIONS

Albert Shalumov, "Systems and Methods for Depth Estimation in a Vehicle", U.S. Appl. No. 17/198,954, filed Mar. 11, 2021.

* cited by examiner

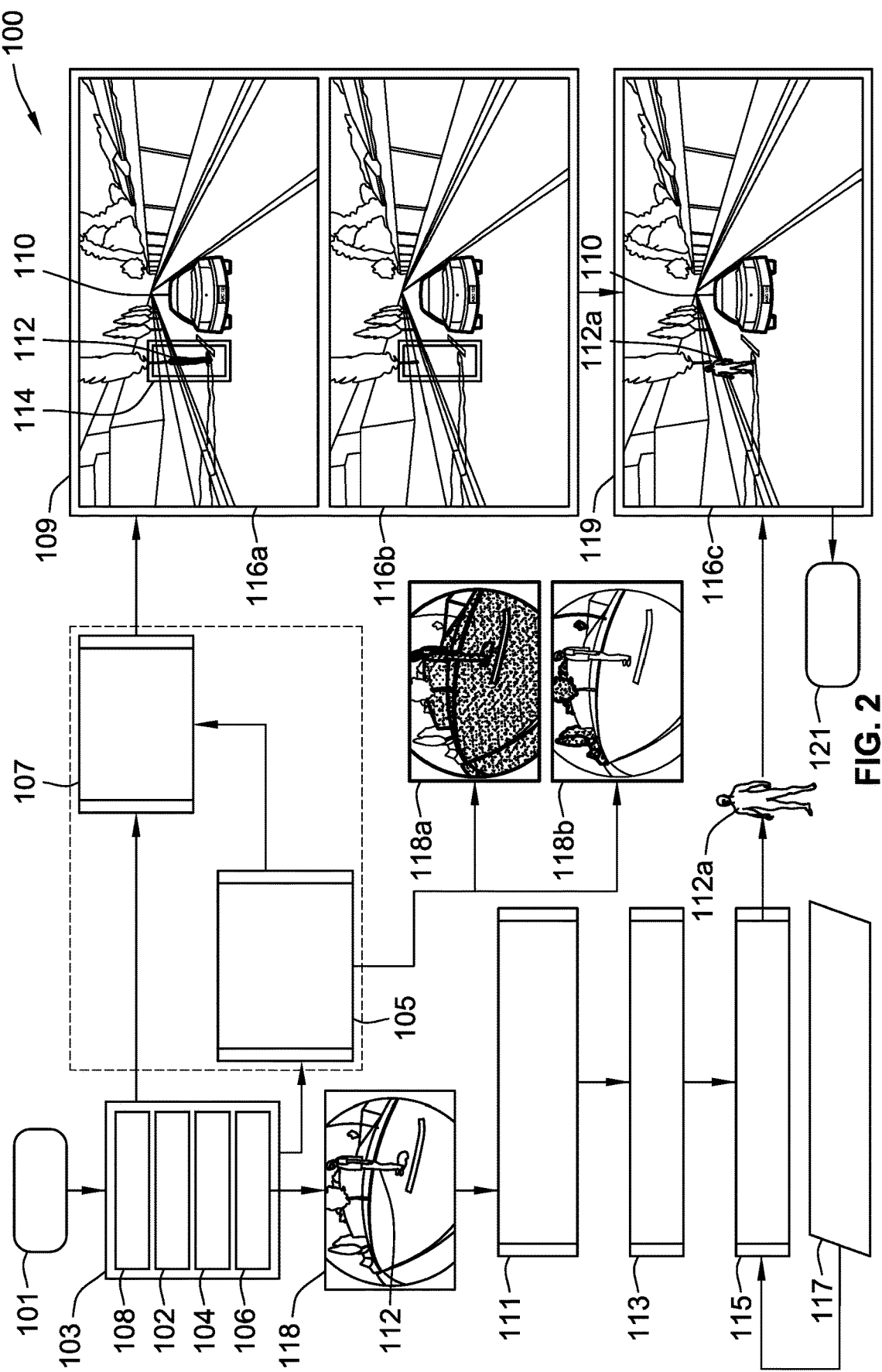

INTELLIGENT VEHICLE SYSTEMS AND CONTROL LOGIC FOR SURROUND VIEW AUGMENTATION WITH OBJECT MODEL RECOGNITION

INTRODUCTION

The present disclosure relates generally to control systems of motor vehicles. More specifically, aspects of this disclosure relate to advanced driving systems with image segmentation, depth inference, and object recognition capabilities.

Current production motor vehicles, such as the modern-day automobile, may be equipped with a network of onboard electronic devices that provide automated driving capabilities to help minimize driver effort. In automotive applications, for example, one of the most recognizable types of automated driving feature is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing headway spacing between the host vehicle and a leading "target" vehicle. Another type of automated driving feature is the Collision Avoidance System (CAS), which detects imminent collision conditions and provides a warning to the driver while also taking preventative action, e.g., by steering or braking without driver input. Intelligent Parking Assist Systems (IPAS), Lane Monitoring and Automated Steering ("Auto Steer") Systems, Electronic Stability Control (ESC) systems, and other Advanced Driver Assistance Systems (ADAS) are also available on many modern-day automobiles.

As vehicle processing, communication, and sensing capabilities continue to improve, manufacturers will persist in offering more automated driving capabilities with the aspiration of producing fully autonomous "self-driving" vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ intelligent control systems to enable vehicle routing with steering, lane changing, scenario planning, etc. Automated path planning systems utilize vehicle state and dynamics sensors, geolocation information, map and road condition data, and path prediction algorithms to provide route derivation with automated lane center and lane change forecasting. Computer-assisted rerouting techniques offer alternative travel route prediction that may be updated, for example, based on real-time and virtual vehicle data.

Many automobiles are now equipped with onboard vehicle navigation systems that utilize a global positioning system (GPS) transceiver in cooperation with navigation software and geolocation mapping services to obtain roadway topography, traffic, and speed limit data associated with the vehicle's real-time location. Autonomous driving and advanced driver assistance systems are often able to adapt automated driving maneuvers based on roadway information obtained by the in-vehicle navigation system. Ad-hoc-network-based ADAS, for example, may employ GPS and mapping data in conjunction with multi-hop geocast V2V and V2I data exchanges to facilitate automated vehicle maneuvering and powertrain control. During assisted and unassisted vehicle operation, the resident navigation system may identify a recommended travel route based on an estimated shortest travel time or estimated shortest travel distance between a route origin and a route destination for a given trip. This recommended travel route may then be displayed as a map trace or as turn-by-turn driving directions on a geocoded and annotated map with optional voice commands output by the in-vehicle audio system.

Automated and autonomous vehicle systems may employ an assortment of sensing components to provide target object detection and ranging. For instance, radio detection and ranging (RADAR) systems detect the presence of, distance to, and/or speed of a target object by discharging pulses of high-frequency electromagnetic waves that are reflected off the object back to a suitable radio receiver. As another option, a vehicle may employ a laser detection and ranging (LADAR) backscatter system that emits and detects pulsed laser beams to make precise distance measurements. Synonymous to—and often used as the umbrella term for—LADAR-based detection is light detection and ranging (LIDAR) technology that determines distances to stationary or moving targets using assorted forms of light energy, including invisible, infrared light spectrums and near-infrared laser light spectrums. A vehicle-mounted sensor farm with assorted digital cameras, ultrasonic sensors, etc., also provides real-time target data. Historically, these object detection and ranging systems may be limited in accuracy and application due to a narrow field-of-view in the near-field of the vehicle and innate system limitations due to constraints on total sensor count and available packaging locations.

SUMMARY

Presented herein are intelligent vehicle systems with networked on-body vehicle cameras and attendant control logic for camera view augmentation using object recognition and model substitution, methods for making and methods for using such systems, and motor vehicles equipped with such systems. By way of example, there are presented systems and methods employing Natural Surround Vision (NSV) techniques to replace detected objects in surround camera views with 3D models retrieved from a model collection database based on object recognition, image segmentation, and depth inference. Such object classification and replacement may be particularly useful for scenarios in which parts of an object are obfuscated from or not visible to the resident camera system and, thus, object rendering from a desired viewpoint is partial. For model collection, computer-vision technology identifies recognizable objects (e.g., vehicles, pedestrians, bicycles, lamp posts, etc.) and aggregates them into corresponding object sets for future reference. Image segmentation is implemented to divide a two-dimensional (2D) camera image into individual segments; the image is then evaluated on a segment-by-segment basis to group each pixel into a corresponding class. In addition, depth inference deduces the 3D structure in a 2D image by assigning a range (depth) to each image pixel. Using an AI Neural Network (NN), object recognition analyzes the 2D camera-generated image to classify characteristics from the image and associate the characteristics of a target object with a corresponding model collection set. The target object is removed and replaced with a 3D object model universal to that set, e.g., in a new "virtual" image.

Attendant benefits for at least some of the disclosed concepts include target acquisition systems that more accurately detect and classify target objects within two-dimensional (2D) camera images, e.g., to provide more comprehensive situational awareness and, thus, enable more intuitive driver and vehicle responses. Other attendant benefits may include provisioning virtual camera sensing capabilities to derive virtual perspectives from auxiliary vantage points (e.g., birds-eye view perspective or trailing-vehicle "chase view" or "dashcam" perspective) using real-world images captured by a resident camera network. Other benefits may include vehicle systems capable of generating virtual views from data captured by physical cameras with improved virtual scene quality while preserving 3D structure of the captured scene and enabling real-time changes to virtual scene perspective.

Aspects of this disclosure are directed to system control logic, intelligent control techniques, and computer-readable media (CRM) for manufacturing and/or for operating any of the disclosed vehicle sensor networks. In an example, a method is presented for controlling operation of a motor vehicle with a sensor array including a network of cameras mounted at discrete locations on the vehicle. This representative method includes, in any order and in any combination with any of the above and below disclosed options and features: receiving, e.g., via one or more resident or remote system controllers from the sensor array, camera data indicative of one or more camera images with a target object from one or more camera perspectives of one or more of the cameras; analyzing, e.g., via the system controller using an object recognition module, the camera image to identify characteristics of the target object and classify the characteristics to a corresponding model collection set, selected from multiple predefined model collection sets, associated with a type of the target object; retrieving, e.g., via the controller from a resident or remote memory-stored object library, a three-dimensional (3D) object model that is universal to the corresponding model collection set associated with the target object type; generating one or more new images (e.g., virtual images) by replacing the target object with the 3D object model positioned in a distinct orientation; and transmitting, e.g., via the system controller, one or more command signals to one or more resident vehicle systems to execute one or more control operations using the new image(s).

Also presented are non-transitory CRM storing instructions that are executable by one or more processors of a system controller of a motor vehicle, which includes a sensor array with a network of cameras mounted at discrete locations on the vehicle body. These instructions, when executed by the one or more processors, cause the controller to perform operations including: receiving camera data from the sensor array indicative of a camera image with a target object from a camera perspective of one of the cameras; analyzing the camera image to identify characteristics of the target object and classify the characteristics to a corresponding one of multiple model collection sets associated with a type of the target object; determining a 3D object model for the corresponding model collection set associated with the type of the target object; generating a new image by replacing the target object with the 3D object model positioned in a distinct orientation; and transmitting a command signal to a resident vehicle system to execute a control operation using the new image (e.g., display the new image as a virtual image).

Additional aspects of this disclosure are directed to motor vehicles equipped with intelligent control systems employing networked on-body vehicle cameras having camera-view augmentation capabilities. As used herein, the terms "vehicle" and "motor vehicle" may be used interchangeably and synonymously to include any relevant vehicle platform, such as passenger vehicles (ICE, HEY, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels, a passenger compartment, and other standard original equipment. A prime mover, such as an electric traction motor and/or an internal combustion engine assembly, drives one or more of the road wheels to thereby propel the vehicle. Also mounted to the vehicle body is a sensor array, which includes a network of cameras mounted at discrete locations on the vehicle body (e.g., front end, rear end, port side, and starboard side cameras).

Continuing with the discussion of the above example, the vehicle also includes one or more resident or remote electronic system controllers that communicate with the sensor array to receive camera data indicative of one or more camera images with a target object from the perspective of one or more of the cameras. Using an object recognition module, the controller(s) analyze the camera image to identify characteristics of the target object and classify these characteristics to a corresponding model collection set that is associated with that type of target object. The controller(s) then access a memory-stored object library to retrieve a 3D object model universal to the predefined model collection set associated with the target object type. A new image, such as a trailing-vehicle chase view virtual image, is then generated by replacing the target object with the 3D object model, which positioned in a new orientation that is distinct from the camera orientation. One or more command signals may thereafter be transmitted to one or more resident vehicle systems to execute one or more control operations using the new image(s).

For any of the disclosed vehicles, systems, and methods, the system controller may implement an image segmentation module to partition the camera image into multiple distinct segments. The segments are then evaluated to group pixels contained therein into corresponding predefined classes. In this instance, the image segmentation module may be operable to execute a computer vision algorithm that individually analyzes each distinct segment to identify the pixels in the segment that share at least one predefined attribute. The segmentation module then assigns a bounding box to delineate the pixels that share one or more predefined attributes associated with the target object.

For any of the disclosed vehicles, systems, and methods, the system controller may implement a depth inference to derive a respective depth ray in 3D space for each image pixel. In this instance, the depth inference module may be operable to receive camera data that is indicative of overlapping camera images containing the target object from multiple camera perspectives of multiple cameras. The depth inference module then processes this camera data through a neural network trained to output depth data and semantic segmentation data using a loss function that combines multiple loss terms including a semantic segmentation loss term and a panoramic loss term. The panoramic loss term provides a similarity measure for overlapping patches of the camera data that each corresponds to a region of overlapping fields of view of the cameras.

For any of the disclosed vehicles, systems, and methods, the system controller may implement an epipolar reprojection module to generate a virtual image of the target object from an alternative perspective of a virtual camera (e.g., as the new image). In this instance, the epipolar reprojection module may be operable to determine a real-time orientation of the camera(s) that captured the camera image(s) and a desired orientation of the virtual camera for presenting the target object from the alternative perspective in the virtual image. The reprojection module then defines an epipolar geometry between the physical camera's real-time orientation and the virtual camera's desired orientation. The virtual image is generated based on a calculated epipolar relation between the camera's real-time orientation and the virtual camera's desired orientation.

For any of the disclosed vehicles, systems, and methods, the system controller may be programmed to implement an object orientation inference module to estimate an orientation of the target object in 3D space relative to a predefined origin axis of the sensor array. In this instance, the orientation of the 3D object model within the new image is determined using the target object's estimated orientation in 3D space. As yet a further option, the system controller may communicate with an occupant input device of the motor vehicle to receive avatar usage protocols with a rule set defining how and/or when the target object is replaced by the 3D object model. Generating the new image(s) may be further based on the avatar usage protocols. The system controller may also derive the size, location, and/or orientation of the target object and, using the target object's derived characteristics, calculate rendering parameters for the 3D object model. These rendering parameters may include a 2D projection of the 3D object model in one or more of the new images.

For any of the disclosed vehicles, systems, and methods, the resident vehicle system may include a virtual image module that displays virtual images and driver prompts based on those virtual images. In this instance, the control operation includes concurrently displaying a virtual image from a trailing-vehicle dashcam view and a prompt to a driver of the vehicle to take a driving action based on this virtual image. Optionally, the resident vehicle system may include an Advanced Driver Assistance System control module that automates control of the motor vehicle. As yet a further option, the resident vehicle system may include a vehicle navigation system with an in-vehicle display device. In this instance, the control operation may include the display device displaying the new image with the 3D object model, e.g., as an integrated augmented reality (AR) chase view.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 2 is a flowchart illustrating a representative object recognition and model substitution protocol for operating a vehicle sensor array with networked cameras, which may correspond to memory-stored instructions that are executable by a resident or remote controller, control-logic circuit, programmable control unit, or other integrated circuit (IC) device or network of devices in accord with aspects of the disclosed concepts.

Figure 1:
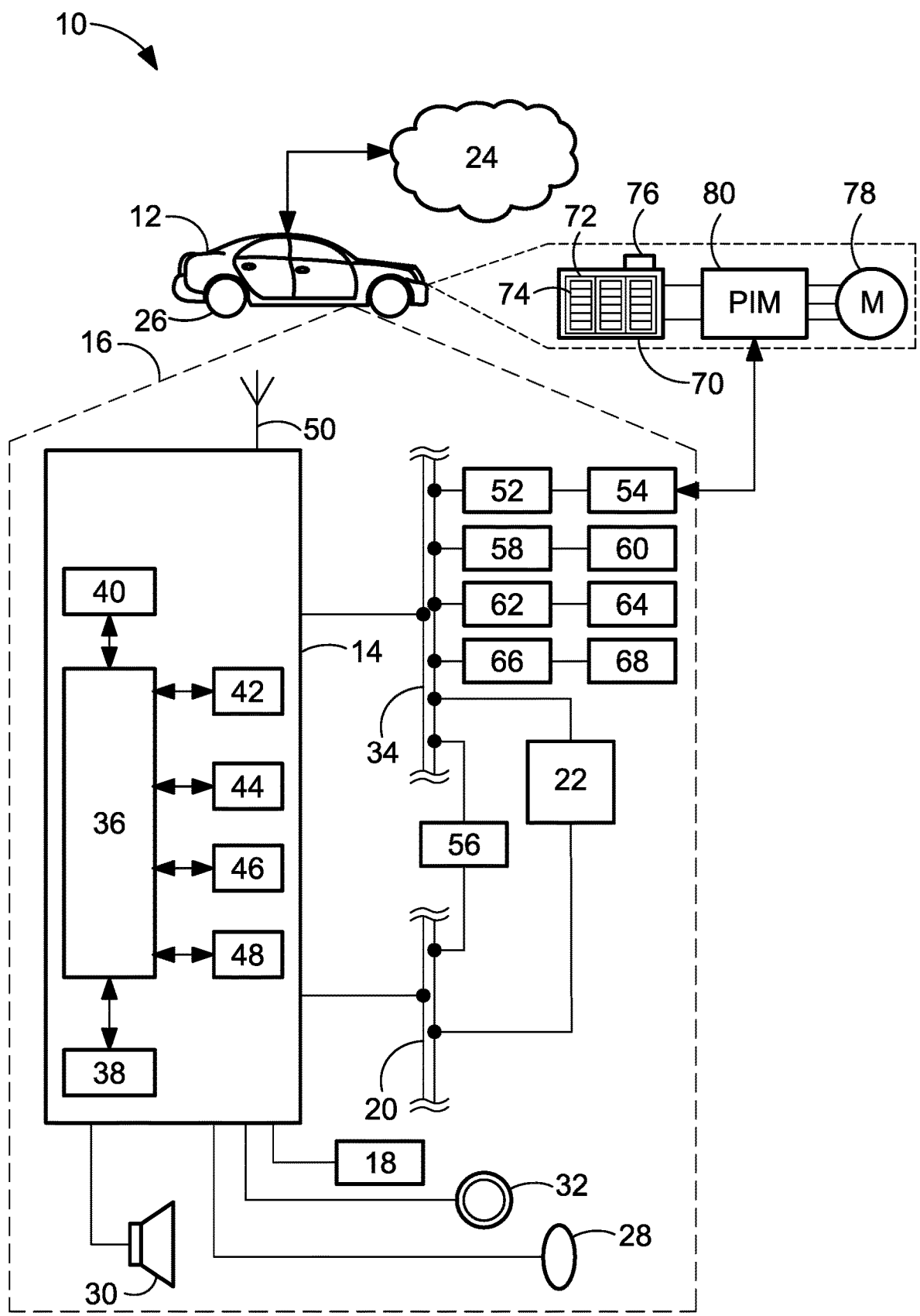
FIG. 1 is a schematic illustration of a representative intelligent motor vehicle with a network of in-vehicle controllers, sensing devices, and communication devices for performing surround view augmentation using recognizable object models in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an all-electric vehicle powertrain should also be appreciated as a non-limiting implementation of disclosed features. As such, it will be understood that aspects and features of this disclosure may be applied to other powertrain architectures, may be implemented for any logically relevant type of vehicle, and may be utilized for assorted navigation and automated vehicle operations. Moreover, only select components of the motor vehicles and vehicle control systems are shown and described in additional detail herein. Nevertheless, the vehicles and vehicle systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other system components within the vehicle 10. Microphone 28 provides a vehicle occupant with means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, media-oriented system transfer (MOST) interfaces, local interconnection network (LIN) interfaces, and the like. Other appropriate communication interfaces may include those that conform with ISO, SAE, and/or IEEE standards and specifications. The network connection interface 34 enables the vehicle hardware 16 to send and receive signals with one another and with various systems and subsystems both within or "resident" to the vehicle body 12 and outside or "remote" from the vehicle body 12. This allows the vehicle 10 to perform various vehicle functions, such as modulating powertrain output, governing operation of the vehicle's transmission, selectively engaging the friction and regenerative brake systems, controlling vehicle steering, regulating charge and discharge of the vehicle's battery modules, and other automated driving functions. For instance, telematics unit 14 receives and transmits signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The various communication devices described above may be configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing an automated driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera(s) 62 may use a complementary metal oxide semiconductor (CMOS) sensor or other suitable optical sensor to generate images indicating a field-of-view of the vehicle 10, and may be configured for continuous image generation, e.g., at least about 35+ images per second. By way of comparison, range sensor(s) 64 may emit and detect reflected radio, infrared, light-based or other electromagnetic signals (e.g., short-range radar, long-range radar, EM inductive sensing, Light Detection and Ranging (LIDAR), etc.) to detect, for example, presence, geometric dimensions, and/or proximity of a target object. Vehicle speed sensor(s) 66 may take on various forms, including wheel speed sensors that measure wheel speeds, which are then used to determine real-time vehicle speed. In addition, the vehicle dynamics sensor(s) 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from the sensing devices 62, 64, 66, 68, the CPU 36 identifies surrounding driving conditions, determines roadway characteristics and surface conditions, identifies target objects within a detectable range of the vehicle, determines attributes of the target object, such as size, relative position, orientation, distance, angle of approach, relative speed, etc., and executes automated control maneuvers based on these executed operations.

These sensors may be distributed throughout the motor vehicle 10 in operatively unobstructed positions relative to views fore or aft or on port or starboard sides of the vehicle. Each sensor generates electrical signals indicative of a characteristic or condition of the host vehicle or one or more targeted objects, generally as an estimate with a corresponding standard deviation. While the operating characteristics of these sensors are generally complementary, some are more reliable in estimating certain parameters than others. Most sensors have different operating ranges and areas of coverage and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating a range and range rate of a target object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A dedicated power inverter module (PIM) 80 electrically connects the battery pack 70 to the motor/generator (M) unit(s) 78 and modulates that transmission of electrical current therebetween. Disclosed concepts are similarly applicable to HEV and ICE-based powertrain architectures.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

With reference next to the flow chart of FIG. 2, an improved method or control strategy for target acquisition, object recognition, and 3D model substitution for surround view augmentation of a host vehicle, such as vehicle 10 of FIG. 1, is generally described at 100 in accordance with aspects of the present disclosure. Some or all of the operations illustrated in FIG. 2, and described in further detail below, may be representative of an algorithm that corresponds to processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 of FIG. 2 begins at START terminal block 101 with memory-stored, processor-executable instructions for a programmable controller or control module or similarly suitable processor to call up an initialization procedure for a camera view augmentation by universal object models protocol. This routine may be executed in real-time, near real-time, continuously, systematically, sporadically, and/or at regular intervals, for example, each 10 or 100 milliseconds during normal and ongoing operation of the motor vehicle 10. As yet another option, terminal block 101 may initialize responsive to a user command prompt, a resident vehicle controller prompt, or a broadcast prompt signal received from an "off-board" centralized vehicle services system (e.g., host cloud computing service 24). Upon completion of the control operations presented in FIG. 2, the method 100 may advance to END terminal block 121 and temporarily terminate or, optionally, may loop back to terminal block 101 and run in a continuous loop.

Method 100 proceeds from terminal block 101 to Sensor Data Input block 103 to acquire image data from one or more available on-body vehicle sensors. Automobile 10 of FIG. 1, for example, may be originally equipped with or retrofit to include a front camera 102 that mounts proximate a forward end of the vehicle body (e.g., on a front grille cover), a rear camera 104 that mounts proximate a rearward end of the vehicle body (e.g., on a rear liftgate or trunk lid), and driver-side and passenger-side cameras 106 and 108, respectively, that each mounts proximate a respective lateral side of the vehicle body (e.g., on starboard and port-side rear-view mirrors). According to the illustrated example, the front camera 102 captures real-time, forward-facing views from the vehicle (e.g., an outboard field of view directed forward of the front bumper assembly), and the rear camera 104 captures real-time, rearward-facing views from the vehicle (e.g., an outboard field of view directed rearward of the rear bumper assembly). In the same vein, the left-hand side camera 106 captures real-time, port side views from the vehicle (e.g., an outboard field of view transverse to a driver-side door assembly), and the right-hand side camera 108 captures real-time, starboard side views from the vehicle (e.g., an outboard field of view transverse to a passenger-side door assembly). Each camera generates and outputs signals indicative of their respective view. These signals may be retrieved directly from the cameras or from a memory device tasked with receiving, sorting, and storing such data.

Upon aggregation, filtering, and preprocessing of the received image data from sensor data block 103, method 100 initiates a Natural Surround Vision (NSV) protocol by executing a Depth & Segmentation predefined process block 105 and an Epipolar Reprojection predefined process block 107. Depth inference may be generally typified as a process by which 3D structure of a 2D image may be inferred by assigning a respective range (depth) to each image pixel. For a vehicle-calibrated camera, each pixel may have directional information wherein a pixel location in an image corresponds to a directional ray in 3D space, e.g., defined by pixel coordinates and camera intrinsic parameters. Adding range along this ray, which may be inferred by a specially trained Neural Network (e.g., using Deep Learning Monocular Depth Estimation), establishes a 3D position of where the pixel is located in 3D space. In FIG. 2, a 2D camera image 118 output by a vehicle-mounted camera 102, 104, 106, 108 may be converted to a computer-augmented greyscale image 118a in which a value of the pixels associated with a particular target is assigned a single shade of grey that represents an average amount of light of those pixels. Doing so facilitates the demarcation of pixel depth of one target object versus another. In at least some implementations, the "greyscale image" is not displayed to a driver nor otherwise visible to a vehicle occupant. In addition, each pixel within a given image segment may be assigned a number of a class into which it is segmented.

Image segmentation may be typified as a computer vision algorithm that divides a 2D image into discrete segments and evaluates the segments of the decomposed image to group each related pixel with similar attributes into a corresponding class (e.g., all pixels for a bicyclist are grouped into a class). During segment evaluation, object detection may build a bounding box corresponding to each class in the image. In FIG. 2, a 2D camera image 118 output by a vehicle-mounted camera 102, 104, 106, 108 may be converted to a computer-augmented greyscale image 118b in which all pixels associated with a particular target is assigned a single shade of grey. Doing so facilitates the demarcation of one target object from other target objects contained in the same image.

For depth inference, a dense depth map may be estimated from image data input by the vehicle-mounted cameras 102, 104, 106 and/or 108. The dense depth map may be estimated, in part, by processing one or more camera images using a Deep Neural Network (DNN), an example of which may include an encoder-decoder architecture programmed to generate depth data and semantic segmentation data. The DNN may be trained based on a loss function that combines loss terms including depth loss, depth smoothness loss, semantic segmentation loss, and panoramic loss. In this example, the loss function is a single multi-task learning loss function. The depth data that is output by the trained DNN may be used in a variety of vehicular applications, including splicing or stitching vehicle camera images, estimating distance between the host and detected objects, dense depth prediction, modifying perspective views, and generating surround views.

Image data from the vehicle's surround-view cameras, which may be in the nature of high-definition, wide-lens cameras (e.g., 180°+ at 1080p+ and 60/30 fps+ resolution), may be processed by the DNN to force consistency in depth estimation. A panoramic loss term may use reprojection to a common viewpoint of the images of the surround cameras as part of the loss function. In particular, a similarity measure may be taken that compares overlapping image patches from adjacent surround view cameras. The DNN employs multi-task learning to co-learn both depth and semantic segmentation. As part of evaluating the panoramic loss term, predefined camera extrinsic and intrinsic parameters, as well as inferred depth, may be used to generate a 3D point cloud. This 3D point cloud is then projected to a common plane to provide a panoramic image. The panoramic loss terms assess similarity of overlapping regions of the panoramic image as part of the loss function. The loss function may combine disparity, its smoothness, semantic segmentation and panoramic loss in a single loss function. Additional information relating to depth estimation and image segmentation can be found, for example, in commonly owned U.S. patent application Ser. No. 17/198,954, to Albert Shalumov et al., which is entitled "Systems and Methods for Depth Estimation in a Vehicle" and is incorporated herein by reference in its entirety and for all purposes.

Using the image data output from sensor data block 103 and the image depth and segmentation data output from predefined process block 105, epipolar reprojection predefined process block 107 may use epipolar geometry to associate the projection of 3D points in space to 2D images in order to relate corresponding points in multi-view camera imagery. In a non-limiting example, an epipolar reprojection module may process the images captured by one or more of the physical cameras 102, 104, 106, 108 and the depth information assigned to the pixels in these captured images using a co-located depth sensor. The physical orientation of each camera that captured an image is ascertained; the epipolar geometry is established between the physical camera and the virtual camera. Generating the virtual image output by the virtual camera may involve resampling the pixel depth information of the captured image in epipolar coordinates, identifying target pixels on a designated epipolar line of the physical camera, deriving a disparity map for an output epipolar line of the virtual camera, and producing the output image based on one or more of these output epipolar lines. A system controller may obtain orientation data for the physical camera(s) and/or depth sensor(s) from a pose measurement sensor or a pose estimation module. Additional information relating to the use of epipolar reprojection for generating virtual camera views can be found, for example, in commonly owned U.S. patent application Ser. No. 17/189,877, to Michael Slutsky et al., which is entitled "Using Epipolar Reprojection for Virtual View Perspective Change" and is incorporated herein by reference in its entirety and for all purposes.

At Virtual Image Data display block 109, one or more virtual images from one or more alternative perspectives of one or more virtual cameras are generated from the epipolar reprojection data output from predefined process block 107. For instance, a first virtual image 116a from a third-person "chase view" perspective (e.g., as if viewing a host vehicle 110 from a trailing vehicle located directly behind the host vehicle 110) shows a target object 112 delineated by a bounding box 114 and adjacent a driver-side fender panel of the host vehicle 110. A second virtual image 116b from the same virtual perspective may be produced to show the target object 112 removed from the bounding box 114. One or both of these images 116a, 116b may be presented to an occupant of a host vehicle (e.g., on video display device 18 or telematics unit 14 of FIG. 1).

Prior to, contemporaneous with, or after executing the NSV protocol, method 100 initiates a Surround View Augmentation protocol by executing an Object Classification & Orientation Inference predefined process block 111. Using the captured image(s) 118 of the host vehicle's surround view, an object classification module identifies one or more target objects (e.g., a pedestrian 112) within the image, and then assigns each target to a corresponding class from an assortment of predefined classes (e.g., motorized vehicles, walking pedestrians, bicyclists and other wheeled pedestrians, lamp posts and other signage, house pets and other animals, etc.). By way of non-limiting example, an AI NN analyzes multiple 2D images generated by a single vehicle camera or multiple vehicle cameras to locate prospective targets, demarcate characteristics from within the image(s) for each prospective target, and then systematically associates these characteristics with corresponding model collection sets to characterize each prospective target accordingly. While presented as a 2D image, for example, almost all objects within a captured image are innately three dimensional.

During object classification in predefined process block 111, an orientation inference module derives a respective orientation for each of the target objects in 3D space relative to the host vehicle. Generally speaking, it may not be sufficient to merely detect a prospective target object without associating the target with its corresponding object class. To properly replace a target object with a computer-generated 3D object model, as described in further detail below, the target is oriented in space, e.g., relative to a predefined origin axis of the vehicle sensor array. By way of non-limiting example, a convolution neural network classifies a viewpoint of the vehicle within the image (e.g., front, rear, port, starboard) by producing bounding boxes around target vehicles proximate the host and deriving a direction or travel for each target vehicle relative to the host vehicle. Using the host vehicle's relative viewpoint and a large scale target dataset, the orientation inference module can identify the orientation of these target vehicles relative to the host. Target object position, size, and orientation may also be estimated using a single monocular image and an inverse perspective mapping to estimate distances to designated portions of the image. In particular, pitch and roll motions of the camera(s) are cancelled using an inertial offset unit; a corrected camera image is then projected (e.g., through a bird's eye view) using inverse perspective mapping. A convolutional NN concurrently detects position, size, and orientation data of the vehicle. A predicted orientation bounding box from the bird's eye view image is converted by an inverse projection matrix. Through this process, the projected bird's eye view image may be aligned to be parallel and linear to an x-y plane of a universal coordinate system against which may be assessed target object orientation.

Once the target object is classified at predefined process block 111, method 100 calls up processor-executable instructions of Object Fetching predefined process block 113 to retrieve a computer-generated 3D object model that is universal to the model collection set associated with the classified type of the target object. For instance, the vehicle sensor system may "fetch" a 3D object model from a memory-stored 3D object library by specifying a "key" for the 3D object model; a suitable database management system (DBMS) routine then fetches the 3D object assigned to that key from the model collection database. Commonly encountered and recognizable objects, such as vehicles, pedestrians, bicycles, lamp posts, etc., are aggregated into corresponding object sets for subsequent reference from the model collection database. A "universal" 3D object model may then be assigned to each object set within the collection; this 3D object replaces a target object from a camera image in a virtual (AR) image. For instance, all target vehicles that have corresponding vehicle characteristics (e.g., wheels, windows, rear-view mirrors, etc.) and fit within a designated sedan vehicle size range (e.g., approximately 13-16 ft in length) may be associated with a corresponding "sedan vehicle" object set and replaced with a 3D model of a basic sedan motor vehicle. Likewise, all pedestrians that have corresponding human characteristics (e.g., head, feet, arms, torso, legs, etc.) and fit within a designated "large adult" human height (e.g., over 5 ft 10 inches) may be associated with a corresponding "large adult" object set and replaced with a 3D model of a basic large human adult 112a.

At Usage Protocol input/output data block 117, a user or occupant of the host vehicle may employ any of the above-described input devices (e.g., user input controls 32 of vehicle 10 of FIG. 1) or a personal computing device (e.g., smartphone, laptop computer, tablet computer, etc.) to define an avatar usage protocol. A user-defined avatar usage protocol may contain one or more rule sets that define the manner in which a target object is replaced, if at all, by a 3D object model. Generally speaking, a driver may be enabled to enter a customized set of rules that determine how and when target objects in a surrounding camera view would be replaced with a computer-graphics image, including the "look and feel" of that replacement image. In this regard, the driver may be allowed to select the 3D object model that will be assigned to a given collection set or the characteristics of that 3D object model. In this regard, the driver may be allowed to disable the target object replacement feature, limit its use to only certain objects, limit its time of use, limit its use to certain driving conditions, limit its use to certain driving settings, etc.

Method 100 advances from process block 113 to Rendering Parameters predefined process block 115 to calculate rendering parameters for the 3D object model that will replace the target object within the virtual image of the virtual camera view. In accord with the illustrated example, an object rendering module ascertains an estimated size of the target object 112 to be replaced, an estimated location of the target object 112 within the host vehicle's surround view, and an estimated orientation of the target object 112 relative to the host vehicle 110. Using the target object's estimated size, location, and orientation, a computer graphics routine renders a 2D projection of the 3D object model 112a with a corresponding size, location, and orientation on the image and superposes the 3D object model 112a in the proper location on the virtual image.

At Virtual Image Data display block 119, a virtual image from an alternative perspective of a virtual camera is generated from the epipolar reprojection data output from predefined process block 107 and the rendering parameter data output from predefined process block 117. For instance, a third virtual image 116c from a third-person "dashcam" perspective shows a 3D object model 112a inserted into the virtual image adjacent the driver-side fender panel of the host vehicle 110. As yet a further option, an ADC module that computer-controls operation of the motor vehicle may govern a vehicle maneuver based on a virtual image that contains the 3D object model. Optionally, an ASAS module that computer-controls operation of the motor vehicle may execute a vehicle maneuver using the virtual image. At this juncture, method 100 may proceed to terminal block 121 and temporarily terminate.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle with a sensor array including a network of cameras mounted at discrete locations on the motor vehicle, the method comprising:
   receiving, via a system controller from the sensor array, camera data indicative of a camera image with a target object from a camera perspective of one of the cameras;
   analyzing, via the system controller using an object recognition module, the camera image to identify characteristics of the target object and classify the characteristics to a corresponding one of multiple model collection sets associated with a type of the target object;
   retrieving, via the system controller from a memory-stored object library, a 3D object model universal to the corresponding model collection set associated with the type of the target object;
   receiving, via the system controller from an occupant input device of the motor vehicle, avatar usage protocols with a rule set defining how and/or when the target object is replaced by the 3D object model; and
   generating, based on the avatar usage protocols, a new image from a chosen viewpoint using camera data from at least one of the cameras and replacing the target object in the new image with the 3D object model positioned in a distinct orientation.

2. The method of claim 1, further comprising:
   partitioning, via the system controller using an image segmentation module, the camera image into a plurality of distinct segments; and
   evaluating the segments to group pixels contained therein into corresponding ones of multiple predefined classes.

3. The method of claim 2, wherein the image segmentation module is operable to execute a computer vision algorithm that individually analyzes each of the distinct segments to identify the pixels in the segment that share a predefined attribute.

4. The method of claim 1, further comprising deriving, via the system controller using a depth inference module, a respective depth for each pixel in the camera image.

5. The method of claim 4, wherein the depth inference module is operable to:
   receive supplemental camera data indicative of overlapping camera images with the target object from multiple camera perspectives of multiple ones of the cameras; and
   process the supplemental camera data through a neural network trained to output depth data and semantic segmentation data using a loss function that combines multiple loss terms including a semantic segmentation loss term and a panoramic loss term, the panoramic loss term including a similarity measure for overlapping patches of the camera data that each corresponds to a region of overlapping fields of view of the multiple ones of the cameras.

6. The method of claim 1, further comprising generating, via the system controller using an epipolar reprojection module, a virtual image from an alternative perspective of a virtual camera, wherein the new image is the virtual image.

7. The method of claim 6, wherein the epipolar reprojection module is operable to:
   receive a real-time orientation of the one of the cameras when capturing the camera image with the target object;
   receive a desired orientation of the virtual camera for presenting the target object from the alternative perspective in the virtual image; and
   define an epipolar geometry between the real-time orientation of the one of the cameras and the desired orientation of the virtual camera,
   wherein the virtual image is generated based on a calculated epipolar relation between the real-time orientation of the camera and the desired orientation of the virtual camera.

8. The method of claim 1, further comprising:
   estimating, via the system controller using an object orientation inference module, an orientation of the target object in 3D space relative to a predefined origin axis of the sensor array; and determining the distinct orientation of the 3D object model within the new image using the estimated orientation of the target object in the 3D space.

9. The method of claim 1, further comprising:
determining a size, location, and orientation of the target object; and
calculating, using the size, location, and orientation of the target object, rendering parameters for the 3D object model, the rendering parameters including a 2D projection of the 3D object model in the new image, wherein generating the new image is further based on the calculated rendering parameters.

10. The method of claim 1, further comprising transmitting, via the system controller, a command signal to a resident vehicle system to execute a control operation using the new image, wherein the resident vehicle system includes a virtual image module operable to display virtual images and driver prompts based on the virtual images, the control operation including concurrently displaying a virtual image from a trailing-vehicle chase view and a prompt to a driver of the vehicle to take a driving action based on the trailing-vehicle chase view.

11. The method of claim 1, further comprising transmitting, via the system controller, a command signal to a resident vehicle system to execute a control operation using the new image, wherein the resident vehicle system includes a vehicle navigation system with a display device, the control operation including displaying, via the display device, the new image with the 3D object model positioned in the distinct orientation.

12. A method for controlling operation of a motor vehicle with a sensor array including a network of cameras mounted at discrete locations on the motor vehicle, the method comprising:
receiving, via a system controller from the sensor array, camera data indicative of a camera image with a target object from a camera perspective of one of the cameras;
analyzing, via the system controller using an object recognition module, the camera image to identify characteristics of the target object and classify the characteristics to a corresponding one of multiple model collection sets associated with a type of the target object;
retrieving, via the system controller from a memory-stored object library, a 3D object model universal to the corresponding model collection set associated with the type of the target object;
deriving, via the system controller using a depth inference module, a respective depth for each pixel in the camera image, the deriving including:
receiving supplemental camera data indicative of overlapping camera images with the target object from multiple camera perspectives of multiple ones of the cameras; and
processing the supplemental camera data through a neural network trained to output depth data and semantic segmentation data using a loss function that combines multiple loss terms including a semantic segmentation loss term and a panoramic loss term, the panoramic loss term including a similarity measure for overlapping patches of the camera data that each corresponds to a region of overlapping fields of view of the multiple ones of the cameras; and
generating a new image from a chosen viewpoint using camera data from at least one of the cameras and replacing the target object in the new image with the 3D object model positioned in a distinct orientation.

13. The method of claim 12, further comprising receiving, via the system controller from an occupant input device of the motor vehicle, avatar usage protocols with a rule set defining how and/or when the target object is replaced by the 3D object model, wherein generating the new image is further based on the avatar usage protocols.

14. The method of claim 12, further comprising:
partitioning, via the system controller using an image segmentation module, the camera image into a plurality of distinct segments; and
evaluating the segments to group pixels contained therein into corresponding ones of multiple predefined classes.

15. The method of claim 14, further comprising executing, via the image segmentation module, a computer vision algorithm that individually analyzes each of the distinct segments to identify the pixels in the segment that share a predefined attribute.

16. The method of claim 12, further comprising:
estimating, via the system controller using an object orientation inference module, an orientation of the target object in 3D space relative to a predefined origin axis of the sensor array; and
determining the distinct orientation of the 3D object model within the new image using the estimated orientation of the target object in the 3D space.

17. A method for controlling operation of a motor vehicle with a sensor array including a network of cameras mounted at discrete locations on the motor vehicle, the method comprising:
receiving, via a system controller from the sensor array, camera data indicative of a camera image with a target object from a camera perspective of one of the cameras;
analyzing, via the system controller using an object recognition module, the camera image to identify characteristics of the target object and classify the characteristics to a corresponding one of multiple model collection sets associated with a type of the target object;
retrieving, via the system controller from a memory-stored object library, a 3D object model universal to the corresponding model collection set associated with the type of the target object;
generating, via the system controller using an epipolar reprojection module, a image from an alternative perspective of a virtual camera, wherein generating the image includes:
receiving a real-time orientation of the one of the cameras when capturing the camera image with the target object;
receiving a desired orientation of the virtual camera for presenting the target object from the alternative perspective in the virtual image;
defining an epipolar geometry between the real-time orientation of the camera and the desired orientation of the virtual camera;
generating the virtual image based on a calculated epipolar relation between the real-time orientation and the desired orientation; and
generating, using the virtual image, a new image from a chosen viewpoint using camera data from at least one of the cameras and replacing the target object in the new image with the 3D object model positioned in a distinct orientation.

18. The method of claim 17, further comprising:
partitioning, via the system controller using an image segmentation module, the camera image into a plurality of distinct segments; and evaluating the segments to group pixels contained therein into corresponding ones of multiple predefined classes.

19. The method of claim 18, wherein the image segmentation module is operable to execute a computer vision algorithm that individually analyzes each of the distinct segments to identify the pixels in the segment that share a predefined attribute.

20. The method of claim 17, further comprising:
estimating, via the system controller using an object orientation inference module, an orientation of the target object in 3D space relative to a predefined origin axis of the sensor array; and
determining the distinct orientation of the 3D object model within the new image using the estimated orientation of the target object in the 3D space.

* * * * *